United States Patent
Sink et al.

(10) Patent No.: US 11,243,084 B2
(45) Date of Patent: Feb. 8, 2022

(54) SYSTEMS AND METHODS FOR IMPROVED DATA INTEGRATION IN AUGMENTED REALITY ARCHITECTURES

(71) Applicant: NAVITAIRE LLC, Minneapolis, MN (US)

(72) Inventors: Raelynn Anderson Sink, Minneapolis, MN (US); Justin Wilde, Salt Lake City, UT (US)

(73) Assignee: NAVITAIRE LLC, Minneapolis, MN (US)

( * ) Notice: Subject to any disclaimer, the term of this patent is extended or adjusted under 35 U.S.C. 154(b) by 108 days.

(21) Appl. No.: 16/530,298

(22) Filed: Aug. 2, 2019

(65) Prior Publication Data
US 2019/0353485 A1  Nov. 21, 2019

Related U.S. Application Data

(62) Division of application No. 15/273,649, filed on Sep. 22, 2016, now Pat. No. 10,429,191.

(51) Int. Cl.
*G01C 21/20* (2006.01)
*G06T 19/00* (2011.01)
(Continued)

(52) U.S. Cl.
CPC ............ *G01C 21/206* (2013.01); *G06F 3/011* (2013.01); *G06F 3/012* (2013.01);
(Continued)

(58) Field of Classification Search
CPC ... G01C 21/206; G06F 3/011; G06F 3/04815; G06F 3/012; G06T 19/006; G06T 19/003; G06Q 50/10; G06Q 90/20; G06Q 30/06; G06Q 30/02; G06Q 30/16; G06Q 10/02; G06Q 10/10
See application file for complete search history.

(56) References Cited

U.S. PATENT DOCUMENTS

| | | | |
|---|---|---|---|
| 9,342,930 B1 * | 5/2016 | Kraft .................... | G06F 3/04842 |
| 2003/0210228 A1 * | 11/2003 | Ebersole ................. | G06F 3/147 |
| | | | 345/157 |

(Continued)

*Primary Examiner* — Thomas Ingram
(74) *Attorney, Agent, or Firm* — Finnegan, Henderson, Farabow, Garrett & Dunner LLP

(57) ABSTRACT

Systems and methods are provided for improved data integration in augmented reality devices. The systems and methods include obtaining contextual information associated with an individual and device information associated with an augmented reality device associated with the individual from the augmented reality device, obtaining a plurality of data sets associated with the individual or augmented reality device from a plurality of data sources, determining a subset of information from the data sets that is relevant to the individual or the augmented reality device wherein the relevancy of the subset of information is based on an analysis of the contextual information and the device information, generating display data based on the determined subset of information, providing the display data to the augmented reality device for display on the augmented reality device wherein a graphical overlay representative of the display data is displayed in front of the individual's field of view.

15 Claims, 9 Drawing Sheets

(51) Int. Cl.
*G06F 3/01* (2006.01)
*G06F 3/0481* (2013.01)

(52) U.S. Cl.
CPC ........ *G06F 3/04815* (2013.01); *G06T 19/003* (2013.01); *G06T 19/006* (2013.01)

(56) References Cited

U.S. PATENT DOCUMENTS

| | | | |
|---|---|---|---|
| 2011/0148922 A1* | 6/2011 | Son | A63F 13/65 |
| | | | 345/633 |
| 2011/0153198 A1* | 6/2011 | Kokkas | G01C 21/3647 |
| | | | 701/533 |
| 2011/0199479 A1* | 8/2011 | Waldman | G01C 21/3602 |
| | | | 348/116 |
| 2013/0102283 A1* | 4/2013 | Lau | H04W 4/02 |
| | | | 455/411 |
| 2013/0211718 A1* | 8/2013 | Yoo | G01C 21/206 |
| | | | 701/500 |
| 2013/0328928 A1* | 12/2013 | Yamagishi | A63F 13/25 |
| | | | 345/633 |
| 2014/0207517 A1* | 7/2014 | Oshima | H04N 5/23293 |
| | | | 705/7.29 |
| 2014/0236475 A1* | 8/2014 | Venkatraman | G01C 21/206 |
| | | | 701/420 |
| 2014/0240350 A1* | 8/2014 | Chen | G06F 3/011 |
| | | | 345/633 |
| 2016/0123745 A1* | 5/2016 | Cotier | G06F 3/011 |
| | | | 701/467 |
| 2017/0193300 A1* | 7/2017 | Shatz | H04N 5/23216 |

\* cited by examiner

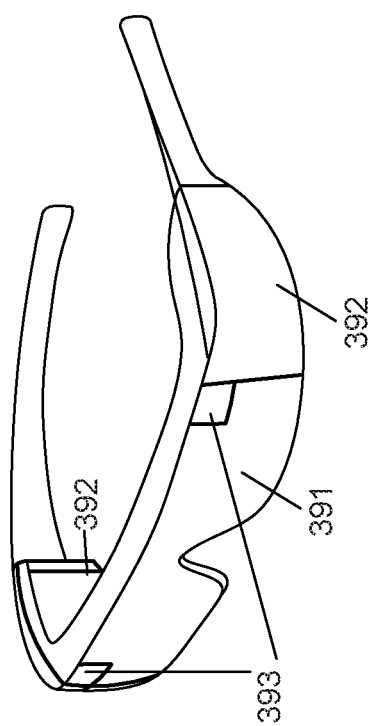

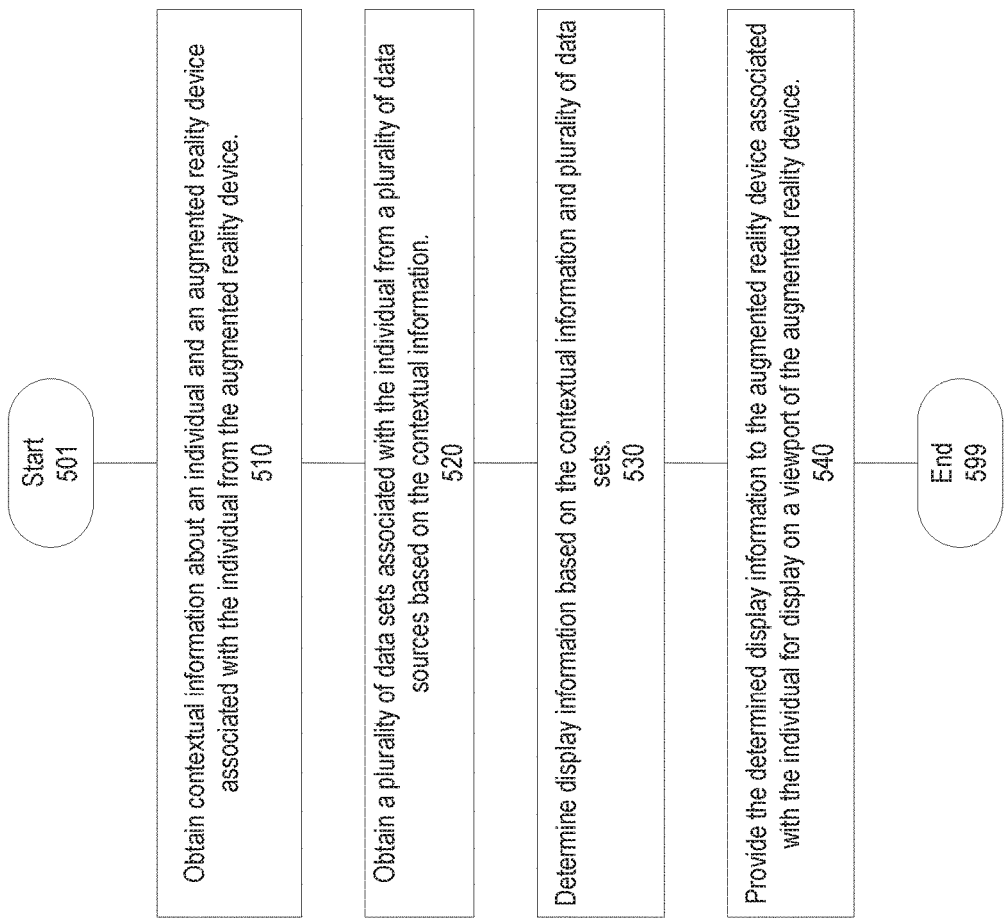

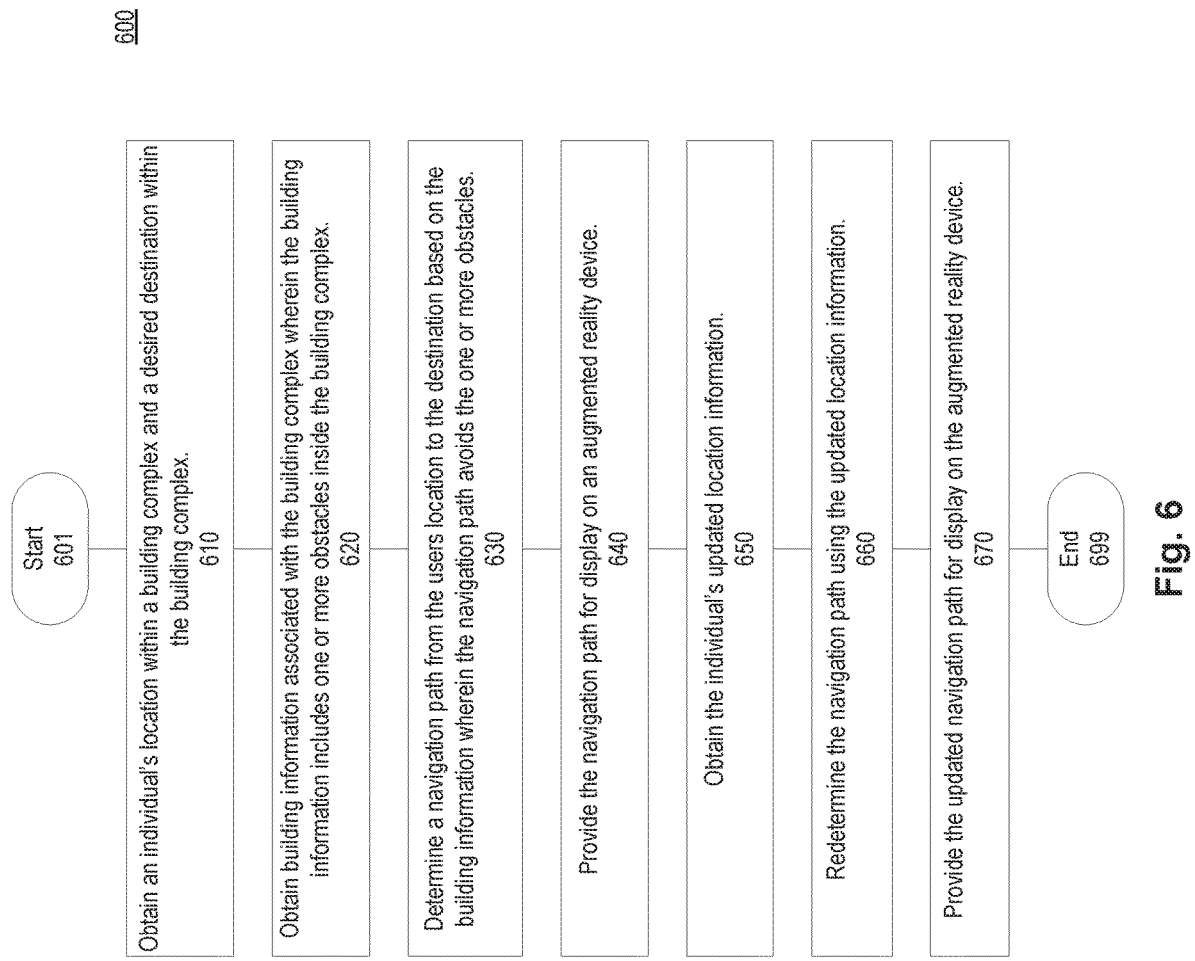

SYSTEMS AND METHODS FOR IMPROVED DATA INTEGRATION IN AUGMENTED REALITY ARCHITECTURES

CROSS-REFERENCE TO RELATED APPLICATION

This application is a division of U.S. patent application Ser. No. 15/273,649, filed Sep. 22, 2016, now allowed. The content of the above-referenced application is expressly incorporated herein by reference to its entirety.

BACKGROUND

The increasing availability of data and data sources in the modern world has driven increase and innovation in the ways that people consume data. Individuals increasingly rely on online resources and the availability of data to inform their daily behavior and interactions. The ubiquity of portable, connected devices has allowed for the access of this type of information from almost anywhere.

The use of this information to augment one's view of the physical world, however, remains in its infancy. Current augmented reality systems can overlay visual data on a screen or viewport providing information overlaid onto the visual world. Although useful, these types of systems are usually limited to simply providing an additional display for information already available to a user or replicate the visual spectrum with overlaid data. There is a need for truly augmented systems that use contextual information and details about the visual perception of a user to provide a fully integrated, augmented reality experience.

BRIEF DESCRIPTION OF THE DRAWINGS

Reference will now be made to the accompanying drawings showing example embodiments of this disclosure. In the drawings:

FIGS. 3A-3B are diagrams of exemplary augmented reality devices, consistent with embodiments of the present disclosure.

FIG. 5 is a flowchart of an exemplary method for improved data integration in augmented reality systems, consistent with embodiments of the present disclosure.

FIG. 6 is a flowchart of an exemplary method for improved data integration in augmented reality systems, consistent with embodiments of the present disclosure.

DETAILED DESCRIPTION

Figure 1:
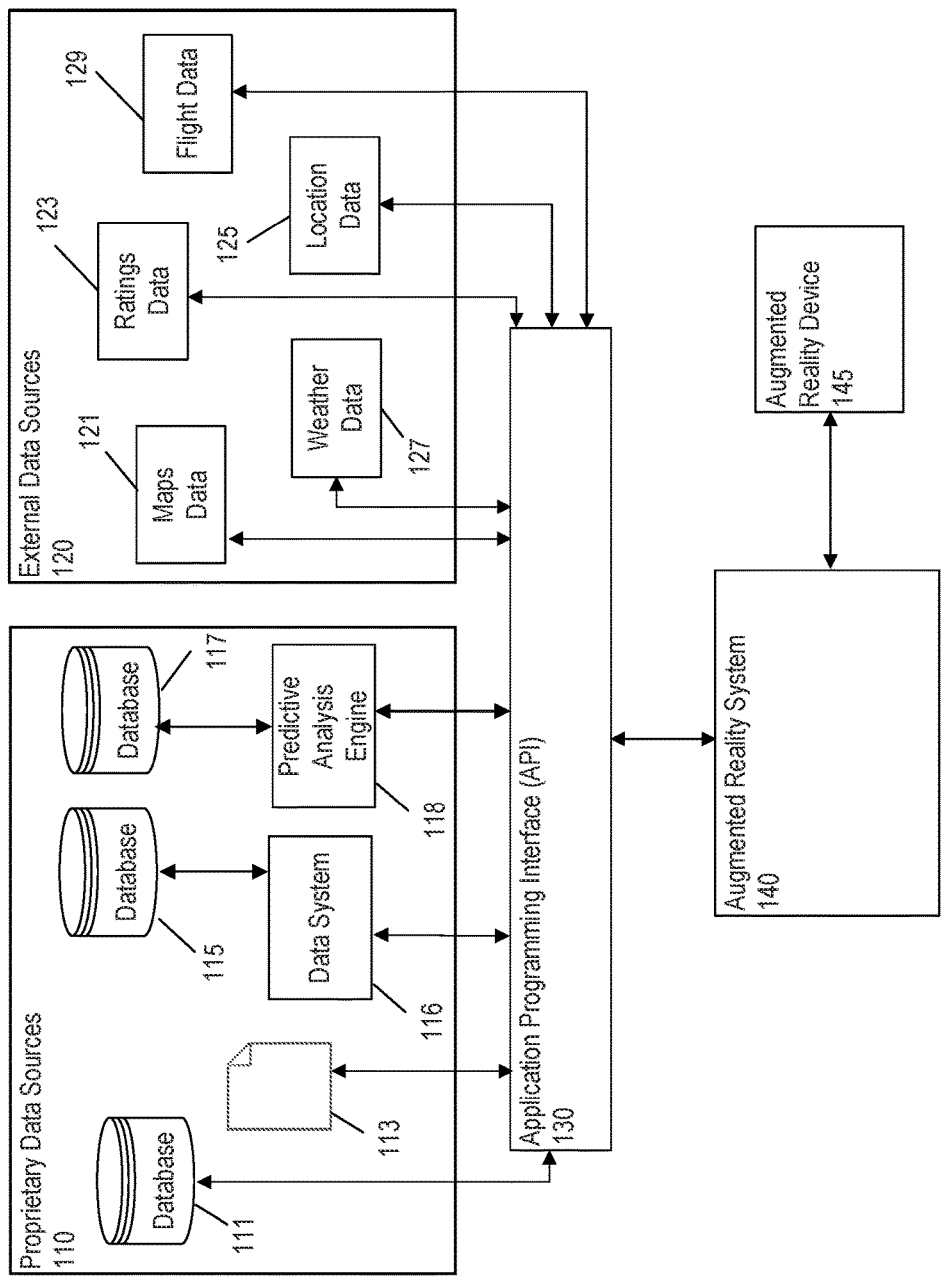
FIG. 1 is a block diagram of an exemplary system for an integrated augmented reality system, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein relate to improved interaction and integration in augmented reality systems. Augmented reality systems provide vast potential for enhancing visual understanding of the world at large. By complementing the visual perspective individuals experience with their eyes, augmented reality systems can provide a more detailed understanding of the world around us.

Current augmented reality systems can overlay computer-generated images and data on a visual field of view providing a visual experience not available with eyes alone. Current implementations, however, of augmented reality systems fail to provide a fully integrated experience. The visual overlay typically relates to things like notifications or alerts. In these systems, although the augmented reality experience provides a useful application, the augmentation is unrelated to the visual focus of the user. In other augmented reality systems, the graphical overlay provides information about things the user is viewing, but the provided information is limited to that particular application and data set.

The embodiments described herein approach these problems from a different perspective. Instead of focusing on providing a limited set of information based on a particular application, the disclosed systems integrate data from the augmented reality device itself with a plethora of data sources associated with the individual. The disclosed systems can further analyze and process the available data using contextual information about the user. The result of this data integration can be provided to the user's augmented reality device to provide a comprehensive overlay of information about seemingly unrelated aspects of the user's visual field of view.

Moreover, the disclosed system and methods can tailor that information based on the contextual information about the individual. The provided overlay can link to other data sources managed by the individual or other parties to provide time, location, and context specific data related to items the individual is viewing.

For example, the system can recognize, based on location information from the augmented reality device or a user's mobile device that the user has arrived at an airport terminal. Using data from the user's digital calendar, along with data about the individual from a travel app hosted by an airline or other travel conveyor, along with other travel software, the disclosed system and methods can further determine that the individual has an upcoming flight. Upon the individual's arrival, the disclosed systems and methods can use available information about the upcoming flight and the present check-in status of the individual to direct the individual to the appropriate check-in kiosk, customer service or ticketing counter or boarding gate. Instead of simply providing augmented information about every ticketing counter, as is typical in current augmented reality systems, the disclosed system's integration of data from multiple data sources provides a tailored experience to the individual while also providing the present state of their reservation transaction with the airline or other travel conveyor.

Additionally, the disclosed system and methods can modernize current airport procedures. For example, in the previously described example, the described augmented reality systems can be used to detect where in the airport an individual is, the number of bags they may have, and where they may need to go. This information can be used by the travel systems to manage flight manifests, automatically check-in users, effectively indicate where checked baggage should be placed, automatically generate baggage tickets, and provide boarding notifications. In this way, not only are the disclosed systems and methods helpful to the traveler, but they can also enhance the efficiency and effectiveness of airport operations by providing enhanced information that is used to make important decisions about flight and travel management.

Moreover, the disclosed system and methods can provide interactive experiences to the individual. The majority of current augmented reality systems simply disseminate information. Systems that do provide some level of interactivity do so based on a user's interaction with a particular application limiting the usefulness. Because the disclosed system and methods provide integrated data tailored specifically to the individual, interaction from the individual can relate to any number activities or services associated with the individual. For example, as an individual waits at a gate to board an aircraft, information related to the individual's flight can not only be used to provide status updates, but can also be integrated with the individual's general flight preferences, purchase preferences, or predictive purchasing analysis of the individual to provide detailed information about, among other things, additional seat availability, upgrade options, in-flight amenities, or pre-flight services. The individual can interact with the augmented reality system to change their seat or pre-select in-flight entertainment. Instead of requiring the individual to explicitly request this type of information, the integration provided in the of the disclosed system and methods allows the system and methods to preemptively provide relevant, useful information to the individual based on contextual information not available from the augmented reality device itself.

The embodiments described herein provide technologies and techniques for using vast amounts of available data (from a variety of data sources) to provide an integrated and interactive augmented reality experience. Embodiments described herein include systems and methods for obtaining contextual information about an individual and device information about an augmented reality device associated with the individual from the augmented reality device. The systems and methods further include obtaining a plurality of data sets associated with the individual or augmented reality device from a plurality of data sources and determining a subset of information from the plurality of data sets relevant to the individual wherein the relevancy of the information is based on the contextual information and the device information obtained from the augmented reality device. Moreover, the embodiments described include systems and methods for generating display data based on the determined subset of information; and providing the display data to the augmented reality device for display on the augmented reality device wherein the display data is overlaid on top of the individual's field of view In some embodiments, the technologies described further include systems and methods wherein the contextual information obtained from the augmented reality device includes visual data representative of the individual's field of view and wherein the relevancy of the subset of information is further based on an analysis of the visual data. Yet another of the disclosed embodiments includes systems and methods wherein the contextual information obtained from the augmented reality device includes at least one of location information, orientation information, and motion information. In other disclosed embodiments systems and methods are provided wherein information obtained from the plurality of data sets (in this case the data is coming from proprietary data sources . . . not the device) includes travel information associated with the individual and wherein the travel information includes at least one of a user profile, travel preferences, purchased travel services, travel updates, and historical travel information.

Additional embodiments consistent with the present disclosure include systems and methods wherein the analysis of the contextual information and device information includes determining entities within the field of view of the individual and filtering information not associated with the entities FIG. 1 is a block diagram of an exemplary system 100 for an integrated augmented reality system, consistent with embodiments of the present disclosure. System 100 can include proprietary data sources 110, including database 111, data source 113, database 115, database 117, data system 116, and predictive analysis engine 118. System 100 can further include external data sources 120 that can include maps data 121, ratings data 123, weather data 127, flight data 129, and location data 125. System 100 can further application programming interface (API) 130. API 130 can be implemented on a server or computer system using, for example, computing device 200, described in more detail below in reference to FIG. 2. For example, data from proprietary data sources 110 and external data sources 120 can be obtained through I/O devices 230 and/or network interface 218 of computing device 200. Further, the data can be stored during processing in a suitable storage such as storage 228 and/or system memory 221. Referring back to FIG. 1, system 100 can further include augmented reality system 140. Like API 130, augmented reality system 140 can be implemented on a server or computer system using, for example, computing device 200.

Figure 2:
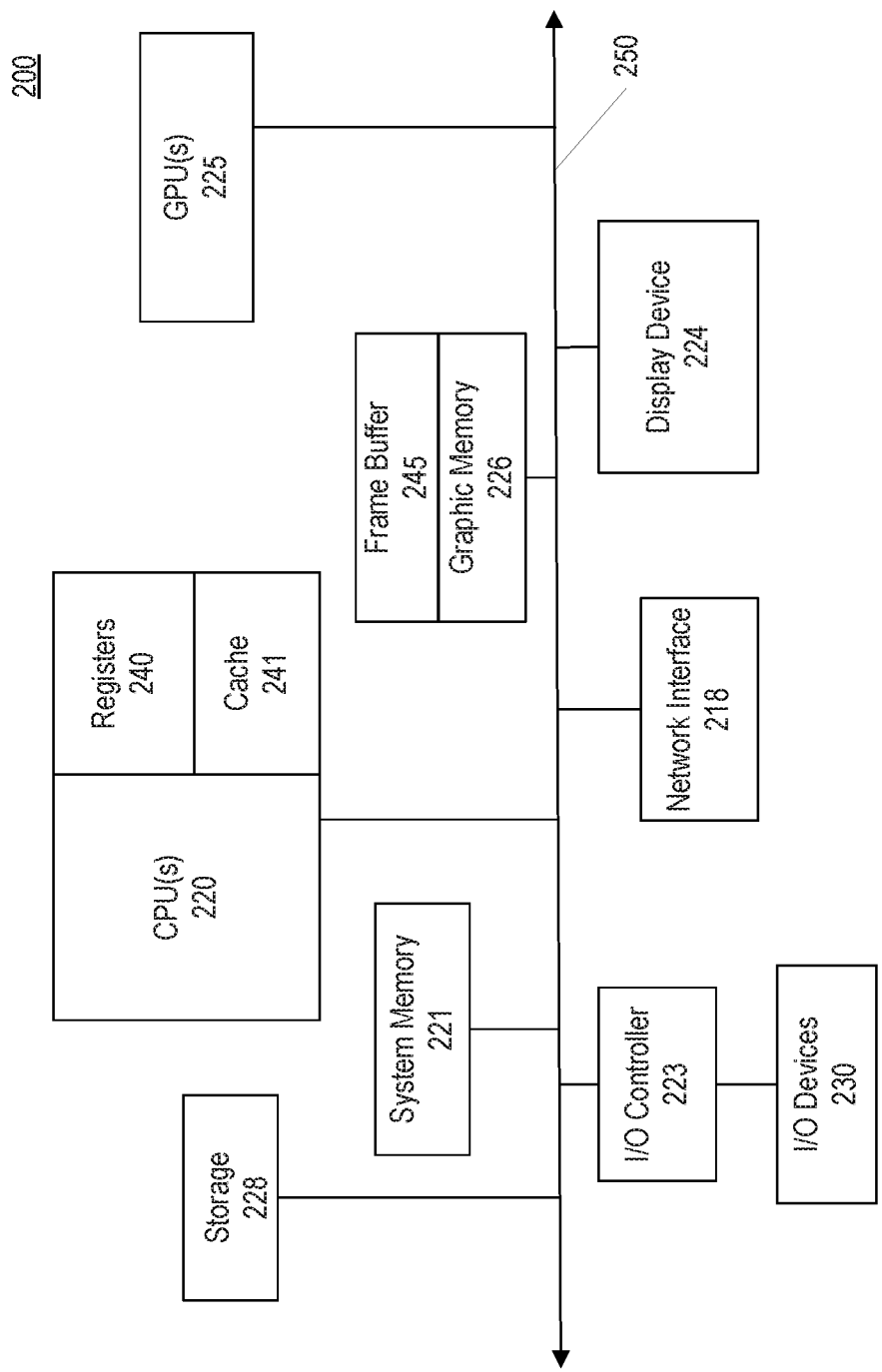
FIG. 2 is a block diagram of an exemplary computing device, consistent with embodiments of the present disclosure.

FIG. 2 is a block diagram of an exemplary computing device 200, consistent with embodiments of the present disclosure. In some embodiments, computing device 200 can be a specialized server providing the functionality described herein. In some embodiments, components of system 100, such as proprietary data sources 110 (e.g., database 111, data source 113, database 115, data system 116, database 117, and predictive analysis engine 118), API 130, augmented reality system 140, and augmented virtual reality device 145) can be implemented using computing device 200 or multiple computing devices 200 operating in parallel. Further, computing device 200 can be a second device providing the functionality described herein or receiving information from a server to provide at least some of the described functionality. Moreover, computing device 200 can be an additional device or devices that store and/or provide data consistent with embodiments of the present disclosure.

Computing device 200 can include one or more central processing units (CPUs) 220 and system memory 221. Computing device 200 can also include one or more graphics processing units (GPUs) 225 and graphic memory 226. In some embodiments, computing device 200 can be a headless computing device that does not include GPU(s) 225 and/or graphics memory 226.

CPUs 220 can be single or multiple microprocessors, field-programmable gate arrays, or digital signal processors capable of executing sets of instructions stored in a memory (e.g., system memory 221), a cache (e.g., cache 241), or a register (e.g., one of registers 240). CPUs 220 can contain one or more registers (e.g., registers 240) for storing variable types of data including, inter alia, data, instructions, floating point values, conditional values, memory addresses for locations in memory (e.g., system memory 221 or graphic memory 226), pointers and counters. CPU registers 240 can include special purpose registers used to store data associated with executing instructions such as an instruction pointer, instruction counter, and/or memory stack pointer. System memory 221 can include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory. System memory 221 can be one or more memory chips capable of storing data and allowing direct access by CPUs 220. System memory 221 can be any type of random access memory (RAM), or other available memory chip capable of operating as described herein.

CPUs 220 can communicate with system memory 221 via a system interface 250, sometimes referred to as a bus. In embodiments that include GPUs 225, GPUs 225 can be any type of specialized circuitry that can manipulate and alter memory (e.g., graphic memory 226) to provide and/or accelerate the creation of images. GPUs 225 can store images in a frame buffer (e.g., frame buffer 245) for output to a display device such as display device 224. In some embodiments, images stored in frame buffer 245 can be provided to other computing devices through network interface 218 or I/O devices 230. GPUs 225 can have a highly parallel structure optimized for processing large, parallel blocks of graphical data more efficiently than general purpose CPUs 220. Furthermore, the functionality of GPUs 225 can be included in a chipset of a special purpose processing unit or a co-processor.

CPUs 220 can execute programming instructions stored in system memory 221 or other memory, operate on data stored in memory (e.g., system memory 221) and communicate with GPUs 225 through the system interface 250, which bridges communication between the various components of computing device 200. In some embodiments, CPUs 220, GPUs 225, system interface 250, or any combination thereof, are integrated into a single chipset or processing unit. GPUs 225 can execute sets of instructions stored in memory (e.g., system memory 221), to manipulate graphical data stored in system memory 221 or graphic memory 226. For example, CPUs 220 can provide instructions to GPUs 225, and GPUs 225 can process the instructions to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224 or can process graphical information and provide that information to connected devices through network interface 218 or I/O devices 230.

Computing device 200 can include display device 224 and input/output (I/O) devices 230 (e.g., a keyboard, a mouse, or a pointing device) connected to I/O controller 223. I/O controller 223 can communicate with the other components of computing device 200 via system interface 250. It is appreciated that CPUs 220 can also communicate with system memory 221 and other devices in manners other than through system interface 250, such as through serial communication or direct point-to-point communication. Similarly, GPUs 225 can communicate with graphic memory 226 and other devices in ways other than system interface 250. In addition to receiving input, CPUs 220 can provide output via I/O devices 230 (e.g., through a printer, speakers, bone conduction, or other output devices).

Furthermore, computing device 200 can include a network interface 218 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Referring back to FIG. 1, system 100 can further include augmented reality device 145. Augmented reality device can a device such as augmented reality device 390 depicted in FIG. 3B, described in more detail below, or some other augmented reality device. Moreover, augmented reality device 145 can be implemented using the components shown in device 300 shown in FIG. 3A, described in more detail below.

Figure 3A:
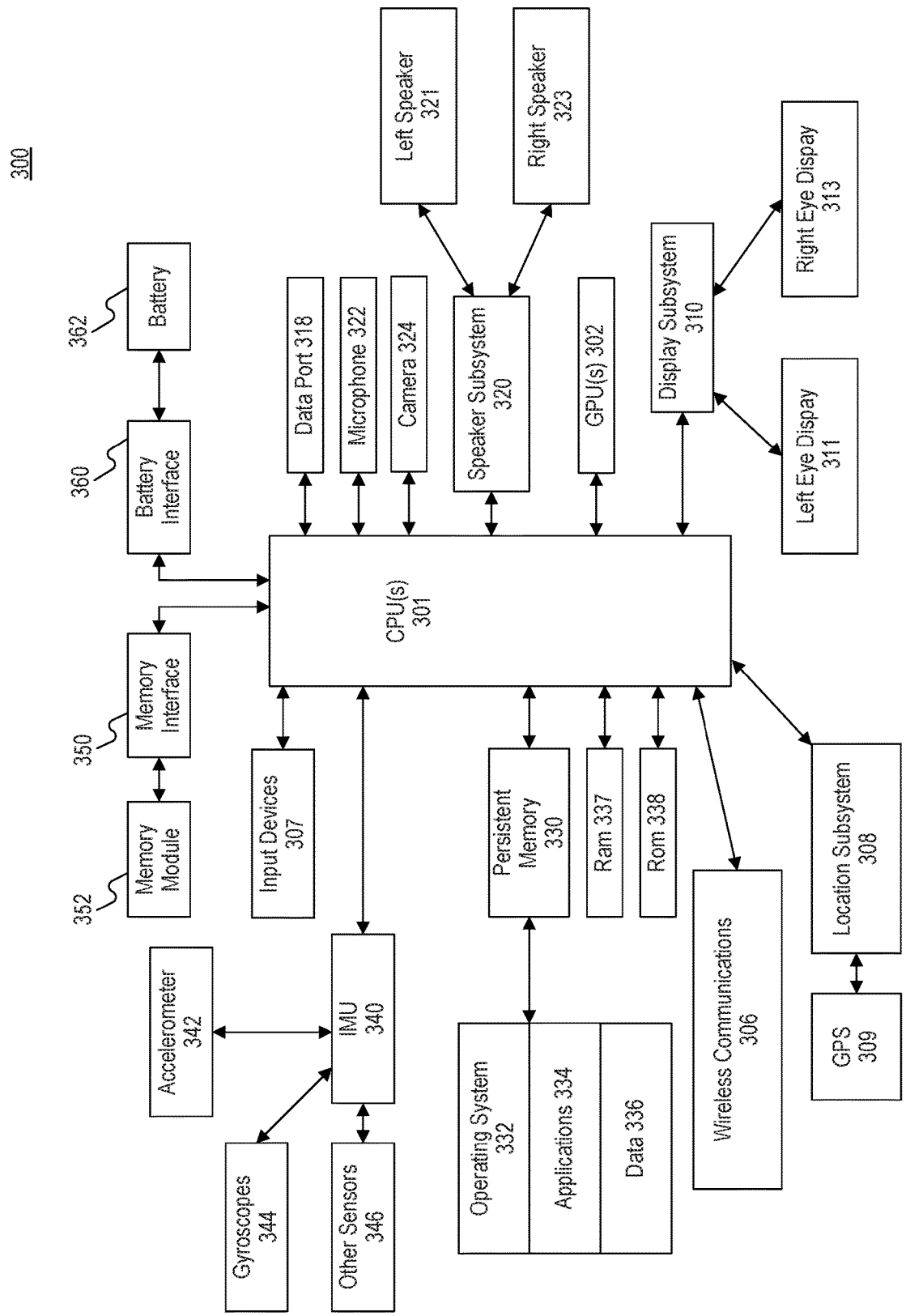

FIGS. 3A-3B are diagrams of exemplary augmented reality devices 300 and 390, consistent with embodiments of the present disclosure. These exemplary augmented reality devices can represent the internal components (e.g., as shown in FIG. 3A) of an augmented reality device and the external components (e.g., as show in FIG. 3B) of an augmented reality device. In some embodiments, FIG. 3A can represent an exemplary electronic device 300 contained within augmented reality device 390 of FIG. 3B.

FIG. 3A is a simplified block diagram illustrating an example electronic device 300. In some embodiments, electronic device 300 can include an augmented reality device having video display capabilities and the capability to communicate with other computer systems, for example, via the Internet. Depending on the functionality provided by electronic device 300, in various embodiments, electronic device 300 can be or can include a handheld device, a multiple-mode communication device configured for both data and voice communication, a smartphone, a mobile telephone, a laptop, a computer wired to the network, a netbook, a gaming console, a tablet, a smart watch, eye glasses, a headset, goggles, or a PDA enabled for networked communication.

Electronic device 300 can include a case (not shown) housing component of electronic device 300. The internal components of electronic device 300 can, for example, be constructed on a printed circuit board (PCB). Although the components and subsystems of electronic device 300 can be realized as discrete elements, the functions of the components and subsystems can also be realized by integrating, combining, or packaging one or more elements together in one or more combinations.

Electronic device 300 can include a controller comprising one or more CPU(s) 301, which controls the overall operation of electronic device 300. CPU(s) 301 can be one or more microprocessors, field programmable gate arrays (FPGAs), digital signal processors (DSPs), or any combination thereof capable of executing particular sets of instructions. CPU(s) 301 can interact with device subsystems such as a wireless communication system 306 for exchanging radio frequency signals with a wireless network to perform communication functions, audio subsystem 320 for producing audio, location subsystem 308 for acquiring location information, and display subsystem 310 for producing display elements.

CPU(s) 301 can also interact with input devices 307, a persistent memory 330, a random access memory (RAM) 337, a read only memory (ROM) 338, a data port 318 (e.g., a conventional serial data port, a Universal Serial Bus (USB)

data port, a 30-pin data port, a Lightning data port, or a High-Definition Multimedia Interface (HDMI) data port), a microphone 322, camera 324, and wireless communications 306 (which can employ any appropriate wireless (e.g., RF), optical, or other short range communications technology (for example, WiFi, Bluetooth or NFC)). Some of the subsystems shown in FIG. 3 perform communication-related functions, whereas other subsystems can provide "resident" or on-device functions.

Wireless communications 306 includes communication systems for communicating with a network to enable communication with any external devices (e.g., a server, not shown). The particular design of wireless communications 306 depends on the wireless network in which electronic device 300 is intended to operate. Electronic device 300 can send and receive communication signals over the wireless network after the required network registration or activation procedures have been completed.

Location subsystem 308 can provide various systems such as global positioning system (e.g., GPS 309) that provide location information. Additionally, location subsystem can utilize location information from connected devices (e.g., connected through wireless communications 306) to further provide location data. The location information provided by location subsystem 308 can be stored in, for example, persistent memory 330, and used by applications 334 and operating system 332.

Display subsystem 310 can control various displays (e.g., left eye display 311 and right eye display 313). In order to provide an augmented reality display, display subsystem 310 can provide for the display of graphical elements (e.g., those generated using GPU(s) 302) on transparent displays. In other embodiments, the display generated on left eye display 311 and right eye display 313 can include an image captured from camera 324 and reproduced with overlaid graphical elements. Moreover, display subsystem 310 can display different overlays on left eye display 311 and right eye display 313 to shoe different elements or to provide a simulation of depth or perspective.

Camera 324 can be a CMOS camera, a CCD camera, or any other type of camera capable of capturing and outputting compressed or uncompressed image data such as still images or video image data. In some embodiments electronic device 300 can include more than one camera, allowing the user to switch, from one camera to another, or to overlay image data captured by one camera on top of image data captured by another camera. Image data output from camera 324 can be stored in, for example, an image buffer, which can be a temporary buffer residing in RAM 337, or a permanent buffer residing in ROM 338 or persistent memory 330. The image buffer can be, for example, a first-in first-out (FIFO) buffer. In some embodiments the image buffer can be provided directly to GPU(s) 302 and display subsystem 310 for display on left eye display 311 and/or right eye display 313 with or without a graphical overlay.

Electronic device can include an inertial measurement unit (e.g., IMU 340) for measuring motion and orientation data associated with electronic device 300. IMU 340 can utilize accelerometer 342, gyroscopes 344, and other sensors 346 to capture specific force, angular rate, magnetic fields, and biometric information for use by electronic device 300. The data capture by IMU 340 and the associated sensors (e.g., accelerometer 342, gyroscopes 344, and other sensors 346) can be stored in memory such as persistent memory 330 or RAM 337 and used by applications 334 and operating system 332. The data gathered through IMU 340 and its associated sensors can also be provided to networked devices through, for example, wireless communications 306.

CPU(s) 301 can be one or more processors that operate under stored program control and executes software modules stored in a tangibly-embodied non-transitory computer-readable storage medium such as persistent memory 330, which can be a register, a processor cache, a Random Access Memory (RAM), a flexible disk, a hard disk, a CD-ROM (compact disk-read only memory), and MO (magneto-optical), a DVD-ROM (digital versatile disk-read only memory), a DVD RAM (digital versatile disk-random access memory), or other semiconductor memories.

Software modules can also be stored in a computer-readable storage medium such as ROM 338, or any appropriate persistent memory technology, including EEPROM, EAROM, FLASH. These computer-readable storage mediums store computer-readable instructions for execution by CPU(s) 301 to perform a variety of functions on electronic device 300. Alternatively, functions and methods can also be implemented in hardware components or combinations of hardware and software such as, for example, ASICs and/or special purpose computers.

The software modules can include operating system software 332, used to control operation of electronic device 300. Additionally, the software modules can include software applications 334 for providing additional functionality to electronic device 300. For example, software applications 334 can include applications designed to interface with systems like system 100 above. Applications 334 can provide specific functionality to allow electronic device 300 to interface with different data systems and to provide enhanced functionality and visual augmentation.

Software applications 334 can also include a range of applications, including, for example, an e-mail messaging application, an address book, a notepad application, an Internet browser application, a voice communication (i.e., telephony or Voice over Internet Protocol (VoIP)) application, a mapping application, a media player application, a health-related application, etc. Each of software applications 334 can include layout information defining the placement of particular fields and graphic elements intended for display on the augmented reality display (e.g., through display subsystem 310) according to that corresponding application. In some embodiments, software applications 334 are software modules executing under the direction of operating system 332.

Operating system 332 can provide a number of application protocol interfaces (APIs) providing an interface for communicating between the various subsystems and services of electronic device 300, and software applications 334. For example, operating system software 332 provides a graphics API to applications that need to create graphical elements for display on electronic device 300. Accessing the user interface API can provide the application with the functionality to create and manage augmented interface controls, such as overlays; receive input via camera 324, microphone 322, or input device 307; and other functionality intended for display through display subsystem 310. Furthermore, a camera service API can allow for the capture of video through camera 324 for purposes of capturing image data such as an image or video data that can be processed and used for providing augmentation through display subsystem 310.

In some embodiments, the components of electronic device 300 can be used together to provide input from the user to electronic device 300. For example, display subsystem 310 can include interactive controls on left eye display 311 and right eye display 313. As part of the augmented display, these controls can appear in front of the user of electronic device 300. Using camera 324, electronic device 300 can detect when a user selects one of the controls displayed on the augmented reality device. The user can select a control by making a particular gesture or movement captured by the camera, touching the area of space where display subsystem 310 displays the virtual control on the augmented view, or by physically touching an input device 307 on electronic device 300. This input can be processed by electronic device 300.

Camera 324 can further include multiple cameras to detect both direct user input as well as used for head tracking and hand tracking. As a user moves their head and hands, camera 324 can provide visual information corresponding to the moving environment and movements of the user's hands. These movements can be provided to CPU(s) 301, operating system 332, and applications 334 where the data can be combined with other sensor data and information related to the augmented information displayed through display subsystem 310 to determine user selections and input.

Moreover, electronic device 300 can receive direct input from microphone 322. In some embodiments, microphone 322 can be one or more microphones used for the same or different purposes. For example, in multi-microphone environments some microphones can detect environmental changes while other microphones can receive direct audio commands from the user. Microphone 322 can directly record audio or input from the user Similar to the visual data from camera 324, audio data from microphone 322 can be provided to CPU(s) 301, operating system 332, and applications 334 for processing to determine the user's input.

In some embodiments, persistent memory 330 stores data 336, including data specific to a user of electronic device 300, such as information of user accounts or device specific identifiers. Persistent memory 330 can also store data relating to those (e.g., contents, notifications, and messages) obtained from services accessed by electronic device 300. Persistent memory 330 can further store data relating to various applications with preferences of the particular user of, for example, electronic device 300. In some embodiments, persistent memory 330 can store data 336 linking a user's data with a particular field of data in an application, such as for automatically providing a user's credentials to an application executing on electronic device 300. Furthermore, in various embodiments, data 336 can also include service data comprising information required by electronic device 300 to establish and maintain communication with a network.

In some embodiments, electronic device 300 can also include one or more removable memory modules 352 (e.g., FLASH memory) and a memory interface 350. Removable memory module 352 can store information used to identify or authenticate a user or the user's account to a wireless network. For example, in conjunction with certain types of wireless networks, including GSM and successor networks, removable memory module 352 is referred to as a Subscriber Identity Module (SIM). Memory module 352 can be inserted in or coupled to memory module interface 350 of electronic device 300 in order to operate in conjunction with the wireless network.

Electronic device 300 can also include a battery 362, which furnishes energy for operating electronic device 300. Battery 362 can be coupled to the electrical circuitry of electronic device 300 through a battery interface 360, which can manage such functions as charging battery 362 from an external power source (not shown) and the distribution of energy to various loads within or coupled to electronic device 300.

A set of applications that control basic device operations, including data and possibly voice communication applications, can be installed on electronic device 300 during or after manufacture. Additional applications or upgrades to operating system software 332 or software applications 334 can also be loaded onto electronic device 300 through data port 318, wireless communications 306, memory module 352, or other suitable system. The downloaded programs or code modules can be permanently installed, for example, written into the persistent memory 330, or written into and executed from RAM 337 for execution by CPU(s) 301 at runtime.

FIG. 3B is an exemplary augmented reality device 390. In some embodiments, augmented reality device 390 can be contacts, glasses, goggles, or headgear that provides a augmented viewport for the wearer. In other embodiments (not shown in FIG. 3B) the augmented reality device can be part of a computer, mobile device, portable telecommunications device, tablet, PDA, or other computing device as described in relation to FIG. 3A.

As shown in FIG. 3B, augmented reality device 390 can include a viewport 391 that the wearer can look through. Augmented reality device 390 can also include processing components 392. Processing components 392 can be enclosures that house the circuitry and modules described above in relation to FIG. 3A. Although shown as two distinct elements on each side of augmented reality device 390, the processing hardware and/or components can be housed in only one side of augmented reality device 390. The components shown in FIG. 3A can be included in any part of augmented reality device 390.

In some embodiments, augmented reality device 390 can include display devices 393. These display devices can be associated with left eye display 311 and right eye display 313 of FIG. 3A. In these embodiments, display devices 393 can receive the appropriate display information from left eye display 311, right eye display 313, and display subsystem 310, and project or display the appropriate overlay onto viewport 391. Through this process, augmented display device 390 can provide augmented graphical elements to be shown in the wearer's field of view.

Referring back to FIG. 1, each of databases 111, 115, and 117, data source 113, data system 116, predictive analysis engine 118, API 130, and augmented reality system 140 can be a module, which is a packaged functional hardware unit designed for use with other components or a part of a program that performs a particular function of related functions. Each of these modules can be implemented using computing device 200 of FIG. 2. Each of these components is described in more detail below. In some embodiments, the functionality of system 100 can be split across multiple computing devices (e.g., multiple devices similar to computing device 200) to allow for distributed processing of the data. In these embodiments the different components can communicate over I/O device 230 or network interface 218 of FIG. 2's computing device 200.

Data can be made available to system 100 through proprietary data sources 110 and external data sources 120. It is appreciated that the exemplary data sources shown for each (e.g., databases 111, 115, and 117, data source 113, data system 116, and predictive analysis engine 118 of proprietary data sources 110 and maps data 121, ratings data 123, weather data 127, flight data 129, and location data 125 of external data sources 120) are not exhaustive. Many different data sources and types of data can exist in both proprietary data sources 110 and external data sources 120. Moreover, some of the data can overlap among external data sources 120 and proprietary data sources 110. For example, external data sources 120 can provide location data 125, which can include data about specific airports or businesses. This same data can also be included, in the same or a different form, in, for example, database 111 of proprietary data sources 110.

Moreover any of the data sources in proprietary data sources 110 and external data sources 120, or any other data sources used by system 100, can be a Relational Database Management System (RDBMS) (e.g., Oracle Database, Microsoft SQL Server, MySQL, PostgreSQL, and/or IBM DB2). An RDBMS can be designed to efficiently return data for an entire row, or record, in as few operations as possible. An RDBMS can store data by serializing each row of data. For example, in an RDBMS, data associated with a record can be stored serially such that data associated with all categories of the record can be accessed in one operation. Moreover, an RDBMS can efficiently allow access of related records stored in disparate tables by joining the records on common fields or attributes.

In some embodiments, any of the data sources in proprietary data sources 110 and external data sources 120, or any other data sources used by system 100, can be a non-relational database management system (NRDBMS) (e.g., XML, Cassandra, CouchDB, MongoDB, Oracle NoSQL Database, FoundationDB, and/or Redis). A non-relational database management system can store data using a variety of data structures such as, among others, a key-value store, a document store, a graph, and a tuple store. For example, a non-relational database using a document store could combine all of the data associated with a particular record into a single document encoded using XML. A non-relational database can provide efficient access of an entire record and provide for effective distribution across multiple data systems.

In some embodiments, any of the data sources in proprietary data sources 110 and external data sources 120, or any other data sources used by system 100, can be a graph database (e.g., Neo4j or Titan). A graph database can store data using graph concepts such as nodes, edges, and properties to represent data. Records stored in a graph database can be associated with other records based on edges that connect the various nodes. These types of databases can efficiently store complex hierarchical relationships that are difficult to model in other types of database systems.

In some embodiments, any of the data sources in proprietary data sources 110 and external data sources 120, or any other data sources used by system 100, can be accessed through an API. For example, data system 116 could be an API that allows access to the data in database 115. Moreover, external data sources 120 can all be publicly available data accessed through an API. API 130 can access the any of the data sources through their specific API to provide additional data and information to system 100.

Although the data sources of proprietary data sources 110 and external data sources 120 are represented in FIG. 1 as isolated databases or data sources, it is appreciated that these data sources, which can utilize, among others, any of the previously described data storage systems, can be distributed across multiple electronic devices, data storage systems, or other electronic systems. Moreover, although the data sources of proprietary data sources 110 are shown as distinct systems or components accessible through API 130, it is appreciated that in some embodiments these various data sources can access one another directly through interfaces other than API 130.

In addition to providing access directly to data storage systems such as database 111 or data source 113, proprietary data sources 110 can include data system 116. Data system 116 can connect to one or multiple data sources, such as database 115. Data system 116 can provide an interface to the data stored in database 115. In some embodiments, data system can combine the data in database 115 with other data or data system 116 can preprocess the data in database 115 before providing that data to API 130 or some other requestor.

Proprietary data sources 110 can further include predictive analysis engine 118. Predictive analysis engine 118 can use data stored in database 117 and can store new data in database 117. Predictive analysis engine can both provide data to other systems through API 130 and receive data from other systems or components through API 130. For example, predictive analysis engine 118 can receive, among other things, information on purchases made by users, updates to travel preferences, browsed services, and declined services. The information gathered by predictive analysis engine 118 can include anything data related to both information stored in the other components of proprietary data sources 110 as well as information from external data sources 120.

Using this data, predictive analysis engine 118 can utilize various predictive analysis and machine learning technologies including, among others, supervised learning, unsupervised learning, semi-supervised learning, reinforcement learning, deep learning. These techniques can be used to build and update models based on the data gathered by predictive analysis engine 118. By applying these techniques and models to new data sets, predictive analysis engine 118 can provide information based on past behavior and/or chooses made by a particular individual. For example, predictive analysis engine can receive data from augmented reality device 145 and augmented reality system 140 regarding a particular individual. Predictive analysis engine 118 can use profile information and past purchase information associated with that individual to determine travel services, such as seat upgrades or in-flight amenities, that the individual might enjoy. For example, predictive analysis engine can determine that the individual has never chosen to upgrade to first class but often purchases amenities such as premium drinks and in-flight entertainment packages. Accordingly, predictive analysis engine can determine that the individual can be presented with an option to purchase these amenities and not an option to upgrade their seat. It is appreciated that predictive analysis engine 118 is capable of using advanced techniques that go beyond this provided example. Proprietary data sources 110 can represent various data sources (e.g., database 111, data source 113, database 115, data system 116, database 117, and predictive analysis engine 118) that are not directly accessible or available to the public. These data sources can be provided to subscribers based on the payment of a fee or a subscription. Access to these data sources can be provided directly by the owner of the proprietary data sources or through an interface such as API 130, described in more detail below.

Although only one grouping of proprietary data sources 110 is shown in FIG. 1, a variety of proprietary data sources can be available to system 100 from a variety of providers. In some embodiments, each of the groupings of data sources will include data related to a common industry or domain. In other embodiments, the grouping of proprietary data sources can depend on the provider of the various data sources.

For example, the data sources in proprietary data sources 110 can contain data related to the airline travel industry. In this example, database 111 can contain travel profile information. In addition to basic demographic information, the travel profile data can include upcoming travel information, past travel history, traveler preferences, loyalty information, and other information related to a traveler profile. Further in this example, data source 113 can contain information related to partnerships or ancillary services such as hotels, rental cars, events, insurance, and parking. Additionally, database 115 can contain detailed information about airports, airplanes, specific seat arrangements, gate information, and other logistical information. As previously described, this information can be processed through data system 116. Accordingly, in this exemplary embodiment, the data sources in proprietary data sources 110 can provide comprehensive travel data.

Similarly to proprietary data sources 110, external data sources 120 can represent various data sources (e.g., maps data 121, ratings data 123, weather data 127, flight data 129, and location data 125). Unlike proprietary data sources 110, external data sources 120 can be accessible to the public or can be data sources that are outside of the direct control of the provider of API 130 or system 100.

Although only one grouping of external data sources 120 is shown in FIG. 1, a variety of external data sources can be available to system 100 from a variety of providers. In some embodiments, each of the groupings of data sources will include data related to a common industry or domain. In other embodiments, the grouping of external data sources can depend on the provider of the various data sources. In some embodiments, the external data sources 120 can represent every external data source available to API 130.

Moreover, the specific types of data shown in external data sources 120 are merely exemplary. Additional types of data can be included and the inclusion of specific types of data in external data sources 120 is not intended to be limiting.

As shown in FIG. 1, external data sources 120 can include maps data 121. Maps data can include location, maps, and navigation information available through a provided API such as, among others, Google Maps API and/or the Open Street Map API. Ratings data 123 can include ratings or review information about businesses, products, locations, etc. For example, ratings data 123 can include data from, among others, the Yelp API, Amazon Customer Reviews API, and/or the TripAdvisor Content API. Location data 125 can include specific data such as business profiles, operating hours, menus, or similar. Weather data 127 can be location specific weather information that can be accessed through, among others, the Dark Sky Forecast API, the Weather Channel API, the NOAA Web Services API, and/or the Weather Underground API. Flight data 129 can include flight information, gate information, and/or airport information that can be accessed through, among others, the FlightStats API, FlightWise API, FlightStats API and the FlightAware API. Each of these external data sources 120 (e.g., maps data 121, ratings data 123, weather data 127, flight data 129, and location data 125) can provide additional data accessed through API 130.

As previously described, API 130 can provide a unified interface for accessing any of the data available through proprietary data sources 110 and external data sources 120 in a common interface. API 130 can be software executing on, for example, a computing device such as computing device 200 described in relation to FIG. 2. In these embodiments, API 130 can be written using any standard programming language (e.g., Python, Ruby, Java, C, C++, node.js, PHP, Perl, or similar) and can provide access using a variety of data transfer formats and/or protocols including, among others, SOAP, JSON objects, REST based services, XML, or similar API 130 can provide receive request for data in a standard format and respond in a predictable format. In some embodiments, API 130 can combine data from one or more data sources (e.g., data stored in proprietary data sources 110, external data sources 120, or both) into a unified response. Additionally, in some embodiments API 130 can process the information from the various data sources to provide additional fields or attributes not available in the raw data. This processing can be based on one or multiple data sources and can utilize one or multiple records from each data source. For example, API 130 could provide aggregated or statistical information such as averages, sums, numerical ranges, or other calculable information. Moreover, API 130 can normalize data coming from multiple data sources into a common format. The previous description of the capabilities of API 130 is only exemplary. There are many additional ways in which API 130 can retrieve and package the data provided through proprietary data sources 110 and external data sources 120.

Augmented reality system 140 can interact with augmented reality device 145 and API 130. Augmented reality system 140 can receive information related to augmented reality device 145 (e.g., through wireless communications 306 of FIG. 3). This information can include any of the information previously described in relation to FIG. 3. For example, augmented reality system can receive location information, motion information, visual information, sound information, orientation information, biometric information, or any other type of information provided by augmented reality device 145. Additionally, augmented reality system 140 can receive identifying information from augmented reality device 145 such as a device specific identifier or authentication credentials associated with the user of augmented reality device 145. Augmented reality system 140 can process the information received and formulate requests to API 130. These requests can utilize identifying information from augmented reality device 145, such as a device identifier or authentication credentials from the user of augmented reality device 145.

In addition to receiving information from augmented reality device 145, augmented reality system 140 can push updated information to augmented reality device 145. For example, augmented reality system 140 can push updated flight information to augmented reality device 145 as it is available. In this way, augmented reality system 140 can both pull and push information from and to augmented reality device 145. Moreover, augmented reality system 140 can pull (e.g., via API 130) information from external data sources 120. For example, if there is a gate change at the airport, augmented reality system 140 can acquire that information and notify the user via augmented reality device 145 via a change in gate information interface (e.g., as provided in gate information 405 of FIG. 4A) and/or in a navigation path (e.g., navigation path 401 of FIG. 4A).

Using the information from augmented reality device 145, augmented reality system 140 can request detailed information through API 130. The information returned from API 130 can be combined with the information received from augmented reality device 145 and processed by augmented reality system 140. Augmented reality system 140 can then make intelligent decisions about updated augmented reality information that should be displayed by augmented reality device 145. Exemplary use cases of this processing are described in more detail below in relation to FIGS. 4A-4C. Augmented reality device 145 can receive the updated augmented reality information and display the appropriate updates on, for example, viewport 391 shown in FIG. 3B, using display devices 393.

Figure 4A:
FIGS. 4A-4C are exemplary uses of augmented reality, consistent with embodiments of the present disclosure.
Figure 4B:
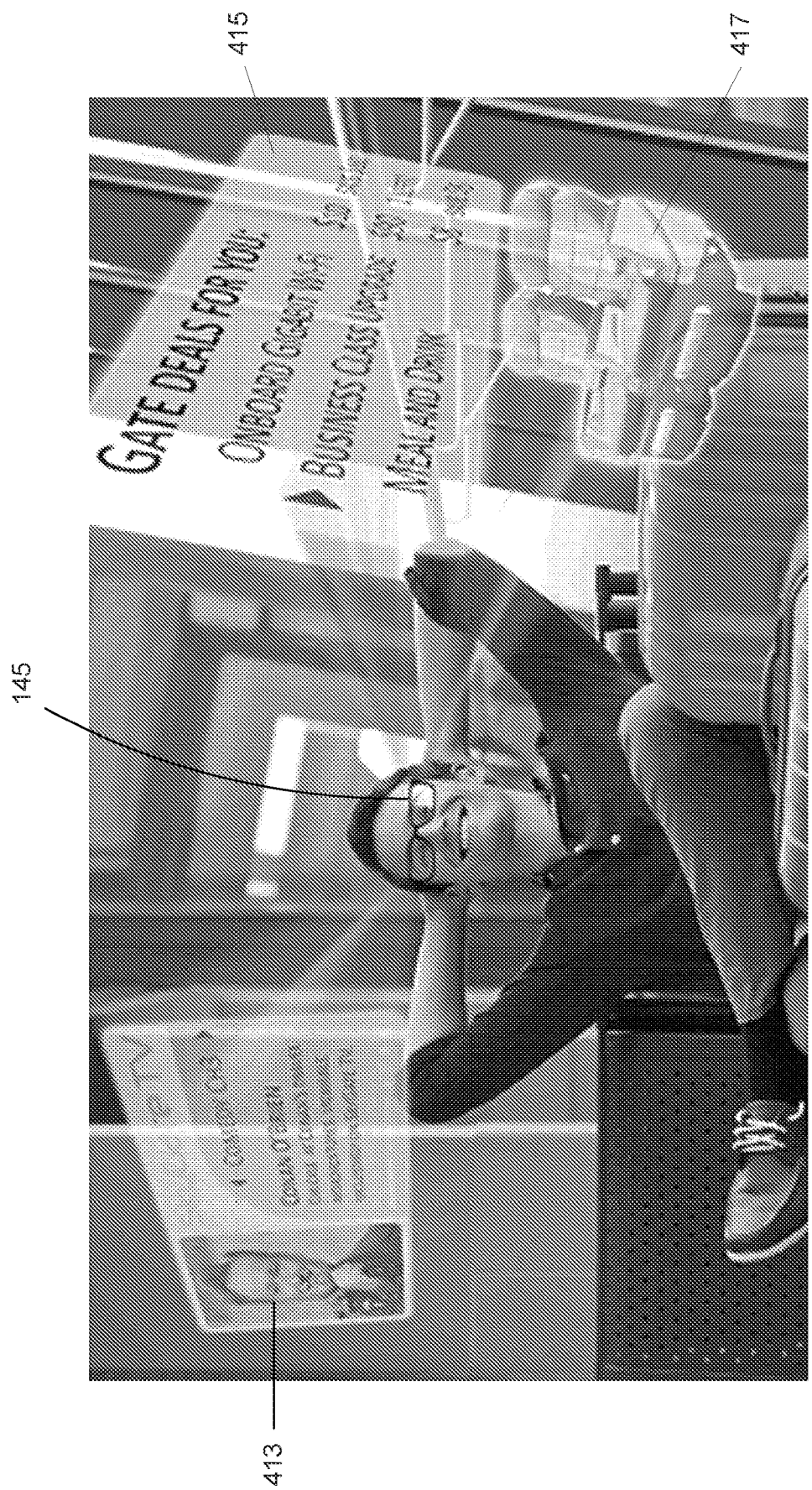
Figure 4C:

FIGS. 4A-4C are exemplary uses of system 100 of FIG. 1, consistent with embodiments of the present disclosure. FIG. 4A is an exemplary augmented view from an augmented reality device (e.g., device 390 from FIG. 3 or augmented reality device 145 from FIG. 1) to navigate through a crowded airport terminal. FIG. 4B is an exemplary use case for using an augmented reality device (e.g., device 390 or augmented reality device 145) for selecting context specific flight amenities and gate entertainment. Throughout descriptions of FIGS. 4A-4C, reference will be made to elements previously discussed in FIGS. 1-3 by their appropriate reference numbers.

FIG. 4A is an exemplary augmented view 400 from an augmented reality device (e.g., device 390 from FIG. 3B or augmented reality device 145 from FIG. 1) to navigate through a crowded airport terminal. Augmented view 400 can be a view through viewport 391 from FIG. 3B and can be the result of the display device 393 from FIG. 3B projecting graphical overlays provided by left eye display 311 and right eye display 313 of display subsystem 310 of FIG. 3A.

Referring back to FIG. 4A, augmented view 400 can represent graphical overlays on viewport 391 resulting in the augmented reality view. For example the augmented elements of augmented view can include navigation path 401, gate information 405, review information 402 and 404, exchange rate information 403, and controls 407.

As previously described, augmented view 400 can provide integrated information based on contextual information about the wearer of the augmented reality device (e.g., augmented reality device 145 of FIG. 1). For example, as demonstrated in FIG. 4A, the augmented reality device can detect, using motion information (e.g., from IMU 340), that the user is moving through airport. The augmented reality device can transmit the user's location in the airport, the movement information, and the user's identifying information to the augmented reality server (e.g., augmented reality server 140 of FIG. 1). The augmented reality server can retrieve profile information related to the user as well as information related to the airport and location of the user (e.g., using API 130 of FIG. 1). The information retrieved by the augmented reality system can be combined with the user's contextual information to provide the graphical elements shown on augmented view 400. In some embodiments the particular graphical elements can be provided, in part, by predictive analysis engine 118 and can be tailored to the user or filtered based on the user's past behavior.

For example, the augmented reality system can use the identifying information and draw from proprietary data sources as well as external data sources to retrieve the departure gate for the user's flight. This information can be directly displayed in, for example, gate information 405. The information can include time to boarding, the gate number, and additional information about the flight, such as the user's position on a standby or upgrade list. Additionally, augmented reality system 140 could combine the user's location information with information about the airport layout to calculate the travel time to the gate.

Moreover, as previously described in relation to FIG. 1, in some embodiments, departure gate information and flight information can be periodically updated. Augmented reality system 140 can pull the updated information through, for example, API 130 and push the updated information to, for example, augmented reality device 145 for display on augmented view 400.

In some embodiments, augmented reality system 140 can further retrieve information about the airport that includes waypoints, geofences, and layouts associated with the airport from data sources available through the API 130. Using this information, augmented reality system 140 can calculate navigation path 401 for the user to direct the user to his or her gate. Navigation path 401 can be transmitted to augmented reality device 145 and displayed on augmented view 400. In some embodiments, augmented reality system 140 can calculate the necessary visual elements for augmented path 401 and transmit them directly to the augmented reality device 145. In other embodiments, the augmented reality system can transmit raw data to augmented reality device 145, and augmented reality device 145 can determine the necessary graphical overlay to produce navigation path 401.

In some embodiments, augmented reality system 140 can further capture visual information from augmented reality device 145 (e.g., using camera 324). Augmented reality system 140 can further process the visual data in order to provide object avoidance for obstacles that may be visible from the camera data but not available through the available data sources provided by API 130. For example, this visual information could include temporary barriers, people, construction, or other obstacles that would require an alternative path. As the user moves through the airport, data can be continuously provided to augmented reality system 140 and augmented reality system 140 can continuously process and analyze that data to determine potential obstructions or obstacles. Augmented reality system 140 can then update navigation path 401 displayed on augmented view 400 as the user moves through the airport.

The continual information flow about the present world, the obstacles, and the intended target destination (e.g., the destination gate) can allow the augmented reality system 140 to continually provide an updated navigation path to augmented reality device 145 for display on augmented view 400. Moreover, the data acquired through augmented reality device 145 can be returned to augmented reality system 140. This information can in turn be provide to, for example, proprietary data sources 110 through API 130. The data can then be used to assist additional individual's viewing the same obstacles. This feedback loop can bolster the effectiveness and efficiency of the system by sourcing updated information about obstacles from multiple active users of augmented reality system 140. Moreover, augmented reality system 140 can compare the visual information with movement information from augmented reality device 145 to determine obstacles a user avoids which were not previously determined to be obstacles. In this way, augmented reality system can improve its identification of obstacles for future path generation by effectively learning what visual shapes or images might correspond to obstacles.

Additionally, augmented reality system 140 can determine that, based on the flight information retrieved for the user through API 130, the user's final destination is Germany. In order to assist the user, augmented reality system 140 can retrieve the airport locations for currency exchanges. This information can be combined with the calculations for navigation path 401, and augmented reality system 140 can provide the location of currency exchanges along the user's path to their gate. Additionally, augmented reality system 140 can provide information about current exchange rates. Augmented reality device can receive this information and display exchange rate information 403 at the location of the currency exchanges. It is appreciated that if the user is not travelling overseas, augmented reality system 140 may not include exchange rate information 403.

Moreover, in some embodiments, augmented reality system can access predictive analysis engine 118, or past purchase history associated with the user and recognize that the user enjoys shopping at the Duty Free store and enjoys eating prior to international flights. Augmented reality system 140 can retrieve Duty Free location information and ratings and restaurant location information and ratings through API 130 and provide that information to augmented reality device 145. Augmented reality device can display the locations and ratings for the relevant Duty Free store and restaurants on augmented view 400 as review information 402 and 404.

In some embodiments, augmented reality system 140 can further use profile information for the user to determine that the user only eats at The Galley Diner while in this particular airport. Accordingly, using this profile information, augmented reality system 140 can filter the information and provide only the locations for The Galley Diner and no other restaurant information to augmented reality device 145. In some embodiments, augmented reality system 140 can emphasize The Galley Diner over other restaurants. Moreover, in some embodiments, augmented reality system 140 can retrieve restaurant recommendations from predictive analysis engine 118 that are based on the user's past restaurant choices. For example, by analyzing data related to restaurant choices by individuals who prefer The Galley Diner, predictive analysis engine can provide augmented reality system 140 with recommended restaurants choices that the user is likely to enjoy.

Through this integration the user receives augmented view 400 fully customized to their particular travel preferences instead of receiving a deluge of all available information as is done in conventional augmented reality systems.

Moreover, augmented reality device 145 and augmented reality system 140 can provide feedback based on the users actions. Building on the previous example, if the user decides to enter The Galley Diner, the user's actions can be captured by augmented reality device 145 and provided to augmented reality 140. Augmented reality 140 can update proprietary data sources 110 through API 130. When augmented reality system 140 queries API 130 for additional information, API 130 can, by using, for example, predictive analysis engine 118 and the previous information that the user has already eaten, provide data to augmented reality system 140 that does not include restaurant locations or recommendations. In some embodiments, predictive analysis engine 118 can determine that the user typically enjoys coffee following a meal, and, accordingly, include information related to coffee bars in the information provided to augmented reality system 140.

FIG. 4B is an exemplary use case for using an augmented reality device (e.g., device 390 or augmented reality device 145) for selecting context specific flight amenities and gate entertainment. FIG. 4B shows a $3^{rd}$ person perspective of a user viewing flight amenities and gate entertainment options through their augmented reality device. FIG. 4B shows entertainment options 413 and flight amenities 415 and 417. As shown in FIG. 4B, augmented reality device 145 can display the graphical overlays in such a way as to give the perception of perspective.

Augmented reality device 145, worn by the user in FIG. 4B, can provide context specific user information to augmented reality system 140. For example, augmented reality device 145 can provide continuous location information to augmented reality server 140. When augmented reality server detects that the user has arrived at his or her gate and has stopped moving, augmented reality server 140 can query API 130 to retrieve user and gate specific information. This information can include the user's profile information as well as flight amenities available both on the plane and at the gate.

Augmented reality system 140 can combine the user profile information, the gate information and the flight information to determine entertainment options that the user may find enjoyable while he or she waits for their flight. This information can be determined by, for example, predictive analysis engine 118, and provided to augmented reality system 140 through API 130. The predictive analysis or past purchases or viewing history may reveal that the user enjoys comedy. Accordingly, augmented reality system 140 can determine that clips from the Conan O'Brien show are available for viewing while at the gate. Augmented reality system 140 can provide this information to augmented reality device 145, which can display entertainment options 413.

As previously described in reference to FIG. 3A, the user can select to watch the offered entertainment. If the entertainment option requires payment, the augmented reality system can use stored payment information for the user to, at the user's direction, purchase the appropriate entertainment package. Upon successful purchase, augmented reality system 140 can provide the selected entertainment media to augmented reality device 145 for display. In some embodiments, augmented reality device 145 can receive the appropriate authorization and credentials and connect directly to the entertainment source.

In some embodiments, the profile information for the user can further be used to determine flight amenity preferences. For example, the user's profile information can indicate that the user prefers business class seats. Augmented reality server 140 can determine, based on flight information retrieved through API 130, that business class seats are available. Augmented reality system can transmit upgrade options to augmented reality device 145 and augmented reality device can display flight amenities 415 and 417 to the user. Augmented reality device can further use left eye display 311 and right eye display 313 to provide perspective to display the available flight amenities 417. The perspective can be used to show life-size representations of the business class seats (e.g., flight amenities 417) so that the user can experience an accurate depiction of what he or she might be purchasing.

FIG. 4C is an exemplary use case for using an augmented reality device (e.g., augmented reality device 145) for gate entertainment. FIG. 4C shows a $3^{rd}$ person perspective of a user viewing gate entertainment through an augmented reality device. FIG. 4C shows augmented reality device 420 used to display gate entertainment in the form of characters 423, 425, and 427, and flight entertainment offer 426.

Unlike the devices described in FIGS. 4A and 4B, augmented reality device 420 (which can represent another form of augmented reality device 145 from FIG. 1) is not a wearable device. Augmented reality device 420 can be a tablet that includes a projector or that communications with augmented reality eyewear (not shown in FIG. 4C) used by the user.

Augmented reality device 420, similarly to that described in FIG. 4B, can recognize that a user is waiting at a gate. Augmented reality system 140 can, through communication with augmented reality device 420, recognize that this particular device is used by a registered traveler's child. Based on the ticket information associated with the registered traveler, augmented reality system can retrieve user profile information that includes both the child's entertainment preferences as well as the travel itinerary information for the family.

Augmented reality system 140 can retrieve this information through, for example, predictive analysis engine 118 and API 130, and can further determine that the family is traveling to an amusement park associated with the child's favorite cartoon characters. Augmented reality system 140 can direct augmented reality device 420 to display an augmented display utilizing those characters that can interact with the child. Additionally, the augmented reality device can provide additional offers and services 426 such as telling the child that his parents might purchase additional entertainment for the flight. In some embodiments, information provided by predictive analysis engine 118 can inform which particular characters are most successful at generating a subsequent purchase and the augmented reality display can favor those characters.

In some embodiments, additional options might include offering special services or entertainment packages at the amusement park to which the family is traveling. In some embodiments, the owner of augmented reality device 420 can specify preferences related to what entertainment options and offers and services can be provided to a child or other family members. Based on these profile preferences, and information related to historical usage patterns or determined by predictive analysis engine 118, augmented reality system 140 can filter data and offerings that might not be useful or desirable to the user.

FIG. 5 is a flowchart of an exemplary method 500 for improved data integration in augmented reality systems, consistent with embodiments of the present disclosure. It will be readily appreciated that the illustrated procedure can be altered to delete steps or further include additional steps. It is appreciated that one or more computing devices (such as the system of FIG. 2 or the electronic device of FIG. 3) can perform the exemplary method and that the functionality described herein can be incorporated as hardware, software stored in the one or more computing devices, or any combination thereof.

After initial step 501, the system (e.g., augmented reality system 140 of FIG. 1) can obtain (step 510) contextual information about an individual and an augmented reality device (e.g., augmented reality device 145 of FIG. 1) associated with the individual from the augmented reality device. The contextual information can include specific profile information about the user of the augmented reality device. Additionally, the contextual information can include information from the various sensors on the augmented reality device (e.g., GPS 309, IMU 340, and Camera 324 of FIG. 3A). The contextual information can additionally include location information for the user. This location information can be based on, for example, GPS (e.g., GPS 309) or retrieved from networking infrastructure (e.g., through wireless communications 306), The augmented reality system can receive this information over a network (e.g., through wireless communications 306 of FIG. 3A) from the augmented reality device.

The augmented reality system can obtain (step 520) a plurality of data sets associated with the individual from a plurality of data sources (e.g., database 111, data source 113, database 115 data system 116, database 117, and predictive analysis engine 118, maps data 121, weather data 127, flight data 129, ratings data 123, and location data 125) based on the contextual information (e.g., using API 130). The contextual information from the augmented reality device can provide a basis for filtering the plurality of data sources. The contextual information can include identifying information about the augmented reality device such as a serial number or unique identifier as well as location, orientation, movement and other information about the current state of the augmented reality device. Using this contextual information the system can retrieve data sets that provide detailed information about the user (e.g., using API 130) that is usually not available from the augmented reality device itself. For example, profile information can include past travel purchases, seat preferences, upcoming flight information, and other information not readily available to the augmented reality system.

The augmented reality system can determine (step 530) display information based on the contextual information and plurality of data sets. After retrieving the various data sets, augmented reality system can merge and filter the data (e.g., using augmented reality system 140). Based on the filtered data, the system can determine the relevant graphical information for display by the augmented reality device. For example, the system can filter out location and recommendation information for restaurants that the user does not like. In some embodiments, the system can utilize retrieved information about the user's travel plans to determine the user's flight details. Determining the relevant personalized display information can allow for relevant data to be provided to the augmented reality device by using information previously unavailable to the augmented reality device.

After determining the display information, the system can provide (step 540) the determined display information to an augmented reality device for display and complete (step 599) the process. The display data can be provided through, for example, wireless communications 306 from FIG. 3. The display information can be projected onto viewport 391 using, for example, display devices 393 and left eye display 311 and right eye display 313 from FIG. 3A. Because of the underlying data integration and filtering based on the contextual information about the user, the displayed graphical data is highly relevant to the user of the augmented reality system.

FIG. 6 is a flowchart of an exemplary method 600 for improved data integration in augmented reality systems, consistent with embodiments of the present disclosure. After initial step 601, the system (e.g., augmented reality system 140 of FIG. 1) can obtain (e.g., from augmented reality device 145 of FIG. 1) an individual's location within a building complex and a desired destination within the building complex. The location can be provided by the augmented reality device based on, for example, GPS (e.g., GPS 309 of augmented reality device 300 of FIG. 3) or other location information stored by the augmented reality device. The location information can be specific to a particular location within a building or building complex. For example, the location can correspond to a specific gate at an airport.

The system can further obtain (step 620) building information associated with the building complex. Based on the location information retrieved from the augmented reality device, the system can retrieve additional information from a plurality of data sources (e.g., proprietary data sources 110 or external data sources 120 of FIG. 1) about the specific location. For example, if the building complex is an airport, the system can retrieve information that includes the layout of the airport and all of the businesses and features of the airport. Moreover, the information related to the airport can include areas of the airport that cannot be traversed over by foot. These areas can be stored as obstacles.

After retrieving the relevant building and any obstacle information, the system can determine (step 630) a navigation path (e.g., navigation path 401 from FIG. 4A) from the user's location to the destination. The determined path can account for the obstacles retrieved in the previous step. The navigation path can be based on the obstacle information as well as the general layout and architecture of the building.

After determining the navigation path, the system can provide (step 640) the determined path to the augmented reality device (e.g., augmented reality device 390 of FIG. 3A). The navigation path can be displayed on augmented reality device. For example, as shown in FIG. 4A, navigation path 401 is displayed on viewport 391 of augmented reality device 390 of FIG. 3B.

As the user follows the navigation path or moves around the airport, the system can obtain (step 650) the user's updated location information from the augmented reality device. Using this updated location information, the system can re-determine (step 660) the navigation path by using the updated location information and the previously retrieved building and obstacle information. The system can provide (step 670) the updated navigation path (along with other relevant information to the augmented reality device for display (e.g., as navigation path 401 in FIG. 4A) and complete (step 699) the process. The updated information can also include and/or update interfaces specific to the location of the user within a defined space, the interfaces of which can include review information 402 and 404 and exchange rate information 403 as shown in FIG. 4A. For example, as a user gets closer to The Galley Diner, the corresponding interface may get larger or be more emphasized. This continuous cycle can allow for the navigation path to constantly update as the user moves around the airport.

Although the previous systems are described in terms of a travel context, the system can be used for many different domains. The features used and data that is incorporated can be based on the specific domain in which the disclosed embodiments are deployed.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by an augmented reality computing system that includes one or more processors to cause the augmented reality computing system to perform a method comprising:
   obtaining contextual information associated with an individual from an augmented reality device, wherein the contextual information includes location information stored by the augmented reality device and identifying information associated with the individual;
   based on the identifying information, obtaining a user profile associated with the individual wherein obtaining the user profile includes obtaining a plurality of data sets from a plurality of data sources and wherein the user profile contains travel information associated with the individual, wherein the travel information includes a predicted purchase determined using a machine learning algorithm;
   determining a subset of information from the plurality of data sets that is relevant to the individual or to the augmented reality device, wherein the relevancy of the subset of information is based on an analysis of the location information and contextual information obtained from the augmented reality device;
   generating display data based on the determined subset of information; and
   providing the display data to the augmented reality device for display on the augmented reality device wherein a graphical overlay representative of the display data is displayed in front of an individual's field of view and wherein the graphical overlay includes information regarding one or more entities in the field of view of the augmented reality device.

2. The non-transitory computer readable storage medium of claim 1, wherein the contextual information obtained from the augmented reality device includes visual data representative of the individual's field of view.

3. The non-transitory computer readable storage medium of claim 1, wherein the relevancy of the subset of information is further based on an analysis of the visual data.

4. The non-transitory computer readable storage medium of claim 1, wherein the contextual information obtained from the augmented reality device includes at least one of orientation information and motion information.

5. The non-transitory computer readable storage medium of claim 1, wherein the travel information includes at least one of a travel preference, a purchased travel service, a travel update, historical travel information, and future travel information.

6. The non-transitory computer readable storage medium of claim 1, wherein the analysis of the contextual information and device information includes determining entities within the field of view of the individual and filtering information not associated with the entities.

7. A method performed by one or more processors and comprising:
   obtaining contextual information associated with an individual from an augmented reality device, wherein the contextual information includes location information stored by the augmented reality device and identifying information associated with the individual;
   based on the identifying information, obtaining a user profile associated with the individual wherein obtaining the user profile includes obtaining a plurality of data sets from a plurality of data sources and wherein the user profile contains travel information associated with the individual, wherein the travel information includes a predicted purchase determined using a machine learning algorithm;
   determining a subset of information from the plurality of data sets that is relevant to the individual or the augmented reality device, wherein the relevancy of the subset of information is based on an analysis of the location information and contextual information obtained from the augmented reality device;
   generating display data based on the determined subset of information; and providing the display data to the augmented reality device for display on the augmented reality device wherein a graphical overlay representative of the display data is displayed in front of an individual's field of view and wherein the graphical overlay includes information regarding one or more entities in the field of view of the augmented reality device.

8. The method of claim 7, wherein the contextual information obtained from the augmented reality device includes visual data representative of the individual's field of view.

9. The method of claim 7, wherein the relevancy of the subset of information is further based on an analysis of the visual data.

10. The method of claim 7, wherein the contextual information obtained from the augmented reality device includes at least one of location information, orientation information, and motion information.

11. The method of claim 7, wherein the contextual information obtained from the augmented reality device includes at least one of orientation information and motion information.

12. The method of claim 7, wherein the travel information includes at least one of a travel preference, a purchased travel service, a travel update, historical travel information, and future travel information.

13. An electronic device comprising:
a data storage configured to store a plurality of data sets obtained from a plurality of data sources and contextual information associated with an individual from an augmented reality device wherein the contextual information includes location information and identifying information; and
one or more processors configured to:

obtain the contextual information from the augmented reality device wherein the contextual information includes location information and identifying information associated with the individual;
based on the identifying information, obtain a user profile associated with the individual wherein the user profile includes travel information associated with the individual, wherein the travel information includes a predicted purchase determined using a machine learning algorithm;
determine a subset of information from the plurality of data sets that is relevant to the individual or the augmented reality device, wherein the relevancy of the subset of information is based on an analysis of the location information and contextual information obtained from the augmented reality device;
generate display data based on the determined subset of information; and
provide the display data to the augmented reality device for display on the augmented reality device wherein a graphical overlay representative of the display data is displayed in front of an individual's field of view and wherein the graphical overlay includes information regarding one or more entities in the field of view of the augmented reality device.

14. The electronic device of claim 13, wherein the contextual information obtained from the augmented reality device includes visual data representative of the individual's field of view.

15. The electronic device of claim 14, wherein the relevancy of the subset of information is further based on an analysis of the visual data.

* * * * *